US009463996B2

United States Patent
Yamamoto et al.

(10) Patent No.: US 9,463,996 B2
(45) Date of Patent: Oct. 11, 2016

(54) GLASS SUBSTRATE FOR DISPLAY COVER GLASS AND ITS PRODUCTION PROCESS

(71) Applicant: Asahi Glass Company, Limited, Tokyo (JP)

(72) Inventors: Hiroyuki Yamamoto, Haibara-gun (JP); Yusaku Matsuo, Tokyo (JP)

(73) Assignee: Asahi Glass Company, Limited, Tokyo (JP)

( * ) Notice: Subject to any disclaimer, the term of this patent is extended or adjusted under 35 U.S.C. 154(b) by 183 days.

(21) Appl. No.: 14/313,113

(22) Filed: Jun. 24, 2014

(65) Prior Publication Data

US 2014/0308512 A1  Oct. 16, 2014

Related U.S. Application Data

(60) Division of application No. 13/466,257, filed on May 8, 2012, now Pat. No. 8,869,558, which is a continuation of application No. PCT/JP2010/070621, filed on Nov. 18, 2010.

(30) Foreign Application Priority Data

Nov. 25, 2009 (JP) ................................. 2009-267869

(51) Int. Cl.
  C03C 21/00 (2006.01)
  C03C 3/076 (2006.01)
  C03C 3/087 (2006.01)
  C03C 3/093 (2006.01)
  C03C 4/00 (2006.01)
  G02F 1/1333 (2006.01)

(52) U.S. Cl.
  CPC ............ *C03C 3/087* (2013.01); *C03C 3/093* (2013.01); *C03C 4/0092* (2013.01); *C03C 21/002* (2013.01); *C03C 21/005* (2013.01); *C03C 2204/02* (2013.01); *G02F 2001/133331* (2013.01); *Y10T 428/265* (2015.01); *Y10T 428/315* (2015.01)

(58) Field of Classification Search
  None
  See application file for complete search history.

(56) References Cited

U.S. PATENT DOCUMENTS

| 4,119,760 A | 10/1978 | Rinehart |
| 2006/0247117 A1* | 11/2006 | Borrelli ................. C03B 23/047 501/10 |
| 2007/0172661 A1 | 7/2007 | Fechner et al. |
| 2010/0028607 A1 | 2/2010 | Lee et al. |
| 2012/0034435 A1* | 2/2012 | Borrelli ................... C03C 17/30 428/210 |

FOREIGN PATENT DOCUMENTS

| JP | 11-110133 A | 4/1999 |
| JP | 11-228186 | 8/1999 |
| JP | 11-319042 | 11/1999 |
| JP | 2007-507407 A | 3/2007 |
| JP | 2007-128054 | 5/2007 |
| JP | WO 2008/047810 A1 | 4/2008 |
| JP | 2008-115072 A | 5/2008 |
| JP | 2009-084076 | 4/2009 |
| JP | 2009-167086 | 7/2009 |
| JP | 2011-133800 A | 7/2011 |

OTHER PUBLICATIONS

International Search Report issued Jan. 11, 2011 in PCT/JP2010/070621 filed Nov. 18, 2010.
Nunzio et al., "Silver containing bioactive glasses prepared by molten salt ion-exchange", J. of the European Ceramic Soc., vol. 24, pp. 2935-2942, 2004.
Corning Gorilla® Glass Technical Materials, copyright 2008, Issued Aug. 2008.
Corning Gorilla® Glass 2 Datasheet, available from www.matweb.com May 14, 2009 per Google.

\* cited by examiner

*Primary Examiner* — Lisa Herring
(74) *Attorney, Agent, or Firm* — Oblon, McClelland, Maier & Neustadt, L.L.P.

(57) ABSTRACT

To provide a glass substrate for a display cover glass not only having excellent strength and antibacterial properties but also having a high transparency and a high visible transmittance suitable as a cover glass for a display device. A glass substrate for a display cover glass, which comprises a surface compressive stress layer and an antibacterial substance-containing layer formed on the glass substrate surface, characterized by having a ratio (T1/T2) of the transmittance T1 at a wavelength of 428 nm to the transmittance T2 at a wavelength of 650 nm of the glass substrate of at least 0.95, and a transmittance at a wavelength of 428 nm of at least 86% when the thickness of the glass substrate is from 0.1 to 3.0 mm.

16 Claims, No Drawings

GLASS SUBSTRATE FOR DISPLAY COVER GLASS AND ITS PRODUCTION PROCESS

The present application is a division of U.S. application Ser. No. 13/466,257, filed May 8, 2012, which is a continuation of PCT/JP10/070621, filed Nov. 18, 2010, which claims priority to JP 2009-267869, filed Nov. 25, 2009.

TECHNICAL FIELD

The present invention relates to a glass substrate useful for a cover glass of display devices, typically display devices having input functions, such as cell-phones, personal digital assistant (PDAs) and touch panels, and its production process.

BACKGROUND ART

In recent years, a cover glass (protective glass) has been frequently used to protect a display and to improve its appearance, on display devices having input functions such as mobile devices such as cell-phones and PDAs and touch panels.

Such a glass substrate for a display cover glass is required to be thin and to have high strength, and a glass substrate having increased strength by a chemical tempering method is commonly used.

Further, for such mobile devices and display devices with touch panels, hygiene management has been required.

To ticket vending machines at stations and ATMs used in the general public, and display devices with touch panels such as devices used in medical care facilities, due to their usage environment, various bacteria are very likely to be attached. Further, mobile devices also have the similar problem, since they are very frequently used although the users are limited.

Accordingly, for such devices and apparatus, it has been desired to impart antibacterial properties particularly to a glass substrate for a display cover glass which people very frequently touch.

In regard to this, glass excellent in antibacterial properties and also excellent in the strength is disclosed in JP-A-11-228186 (Patent Document 1). This document discloses that antibacterial properties and high strength (bending strength) can be imparted to glass by treating glass containing sodium with a molten salt of silver nitrate and potassium nitrate to replace sodium ions contained in glass with both of potassium ions and silver ions. Further, to provide glass also excellent in the transparency, it is considered preferable that the proportion (weight ratio) of a compound capable of donating $M^+$ which replaces sodium ions of glass, to an antibacterial substance, is within a specific range.

PRIOR ART DOCUMENT

Patent Document

Patent Document 1: JP-A-11-228186

DISCLOSURE OF INVENTION

Technical Problem

However, the present inventors have prepared the soda-lime glass A as disclosed in Patent Document 1 and prepared the glass in Example with good transparency to confirm the transparency, whereupon it was found to have a low transmittance in the visible region and be insufficient as a glass substrate for a display cover glass. The reason is considered that silver ions are diffused quickly as compared with potassium ions, and when treatment is conducted to obtain a desired strength, silver ions will excessively be diffused in glass, and the diffused silver ions are formed into a colloid, whereby glass is colored and has absorptivity to a specific wavelength in the visible region.

Under these circumstances, it is an object of the present invention to provide a glass substrate for a display cover glass not only having a high strength and excellent antibacterial properties but also having a high transparency and a high visible transmittance suitable as a cover glass for display devices, and its production process.

Solution to Problem

The present inventors have focused attention on that formation of silver in a silver ion diffusion layer which imparts antibacterial properties to glass, into a colloid, inhibits the transparency of glass, and they have found that a strength, antibacterial properties and a transparency suitable as a glass substrate for a display cover glass can be obtained by controlling the transmittance in the vicinity of 428 nm which is the absorption wavelength of silver colloid to be within a specific range.

That is, the glass substrate for a display cover glass of the present invention comprises a surface compressive stress layer and an antibacterial substance-containing layer on the glass substrate surface, and is characterized by having a ratio (T1/T2) of the transmittance T1 at a wavelength of 428 nm to the transmittance T2 at a wavelength of 650 nm of the glass substrate of at least 0.95, and a transmittance at a wavelength of 428 nm of at least 86% when the thickness of the glass substrate is from 0.1 to 3.0 mm.

Further, the glass substrate for a display cover glass of the present invention is characterized in that the glass substrate has a glass composition comprising, as represented by mol % as calculated as oxides, from 55 to 80% of $SiO_2$, from 0.1 to 15% of $Al_2O_3$, from 0 to 15% of $B_2O_3$, from 0 to 10% of ZnO, from 0.1 to 15% of $Na_2O$, from 0 to 10% of $K_2O$, and from 0 to 16% of MgO+CaO.

Further, the glass substrate for a display cover glass of the present invention is characterized in that the surface compressive stress layer on the glass substrate surface is formed by chemical tempering, and the surface compressive stress layer has a depth of at least 3 μm and a surface compressive stress of a least 250 MPa.

Further, the glass substrate for a display cover glass of the present invention is characterized in that the antibacterial substance-containing layer is a silver ion diffusion layer having silver ions diffused in the glass substrate surface.

Further, the glass substrate for a display cover glass of the present invention is characterized in that the silver ion diffusion layer has a silver amount of from 0.2 to 100 μg/cm² at a depth of 40 μm from the glass substrate surface.

Further, the glass substrate for a display cover glass of the present invention is characterized in that the glass substrate is plate-formed by a float process.

Further, the glass substrate for a display cover glass of the present invention is characterized in that it is used for a cover glass of a touch panel display.

Further, the present invention provides a display device, which uses the above glass substrate for a display cover glass as a front glass of a display.

The process for producing a glass substrate for a display cover glass of the present invention comprises a step of chemically tempering a glass substrate in a molten salt containing at least $KNO_3$, a step of cleaning the chemically tempered glass substrate, a step of forming a silver film on the surface of the cleaned glass substrate, a step of subjecting the glass substrate having the silver film formed thereon to heat treatment to diffuse silver ions from the glass substrate surface to the inside, and a step of washing and removing silver remaining on the surface, not diffused in the inside of the glass substrate in the above step of diffusing silver ions.

Further, the process for producing a glass substrate for a display cover glass of the present invention comprises a step of plate-forming a glass substrate, a step of chemically tempering the plate-formed glass substrate in a molten salt containing at least $KNO_3$, a step of cleaning the chemically tempered glass substrate, a step of forming a silver film on the surface of the cleaned glass substrate, a step of subjecting the glass substrate having the silver film formed thereon to heat treatment to diffuse silver ions from the glass substrate surface to the inside, and a step of washing and removing silver remaining on the surface, not diffused in the inside of the glass substrate in the above step of diffusing silver ions.

Further, the process is characterized in that the step of plate-forming a glass substrate is carried out by a float process.

Further, the process is characterized in that the step of diffusing silver ions involves a step of subjecting the glass substrate having the silver film formed thereon to heat treatment at from 300 to 475° C.

Advantageous Effects of Invention

According to the present invention, a glass substrate for a display cover glass not only having a high strength and excellent antibacterial properties, but also having a high transparency and a high visible transmittance by suppressing coloring of glass due to silver colloid, can be obtained.

DESCRIPTION OF EMBODIMENTS

The glass substrate for a display cover glass of the present invention comprises a surface compressive stress layer on the substrate surface. By having the surface compressive stress layer on the glass substrate surface, the strength of the glass substrate can dramatically be improved.

As a method to form a compressive stress layer on the glass substrate surface, an air quenching tempering method (physical tempering method) wherein the surface of a glass substrate heated to near the softening point is quenched by air cooling or the like and a chemical tempering method wherein alkali metal ion having a small ion radius (typically Li ions or Na ions) on the surface of a glass substrate are exchanged with alkali metal ions having a larger ion radius (typically K ions) by ion exchange at a temperature of at most the glass transition point, may be applied.

Particularly in a case of forming a surface compressive stress layer on a thin glass substrate, if the air quenching tempering method is applied, the temperature difference between the surface and the inside tends not to arise, and it is thereby difficult to form a surface compressive stress layer, and desired strength can hardly be obtained. Therefore, it is preferred to form a surface compressive stress layer by the chemical tempering method.

The thickness of the glass substrate for a display cover glass of the present invention is typically preferably from 0.2 to 3.0 mm when weight saving is particularly required, for example, in the case of being used for mobile devices. If it is less than 0.2 mm, even though the chemical tempering is carried out, the desired strength may not be obtained from the viewpoint of the strength for practical use. If it exceeds 3.0 mm, such is unfavorable in view of the weight saving. It is more preferably from 0.5 to 1.5 mm.

When weight saving is not particularly required, for example, in the case of being used for fixed devices without being carried, it is possible to apply the present invention even when the thickness of the glass substrate exceeds 3.0 mm for example. It is possible to apply the physical tempering when the thickness of the glass substrate exceeds 3.0 mm, however, the surface compressive stress imparted by the physical tempering is commonly at a level of from 100 to 150 MPa, and accordingly when a further higher surface compressive stress is required, a glass substrate having a higher strength can be obtained by forming a surface compressive stress layer by the chemical tempering.

The surface compressive stress layer of the glass substrate for a display cover glass of the present invention preferably has a depth of at least 3 µm. If the depth is less than 3 µm, the strength is insufficient as a glass substrate for a display cover glass, and the scratch resistance (likelihood of indentations when injured) of the glass substrate surface tends to be deteriorated. The depth of the surface compressive stress layer is preferably from 5 µm to 100 µm, more preferably from 7 to 80 µm.

The surface compressive stress of the glass substrate for a display cover glass of the present invention is preferably from 250 to 1,050 MPa. If the surface compressive stress is less than 250 MPa, the strength is insufficient as a glass substrate for a display cover glass, and the scratch resistance of the glass substrate surface tends to be deteriorated. Further, if it exceeds 1,050 MPa, the internal tensile stress tends to be large, and when cracks progress into the inside of the glass substrate e.g. by an impact, explosive destruction may occur, such being unfavorable in view of the safety. The surface compressive stress is preferably from 300 to 800 MPa, more preferably from 350 to 750 MPa.

The glass substrate for a display cover glass of the present invention comprises an antibacterial substance-containing layer on the substrate surface. By having the antibacterial substance-containing layer on the glass substrate surface, antibacterial functions can be imparted to the glass substrate.

The antibacterial substance-containing layer formed on the glass substrate surface is roughly classified into a layer containing silver itself and a silver ion diffusion layer. As a method of forming the layer containing silver itself, a method of mixing silver with glass materials, followed by melt forming, and a method of forming a coating layer containing silver on the glass substrate surface, have been known. On the other hand, as a method of forming the silver ion diffusion layer, a method of coating the glass substrate surface with a liquid containing silver, followed by heat treatment to form the silver ion diffusion layer over from the glass substrate surface to the inside of the substrate, has been known. By the method of forming the silver ion diffusion layer, as compared with the method of forming the layer containing silver itself, the antibacterial properties will not be eliminated in a short time e.g. by abrasions, and the quality of the glass substrate surface will not remarkably be changed. Accordingly, to impart antibacterial functions to the glass substrate for a display cover glass of the present invention, it is preferred to employ the method of forming the silver ion diffusion layer. Further, in the method of forming the silver ion diffusion layer, as a method of forming silver on the glass substrate surface, in addition to the above method of coating the glass substrate surface with a liquid containing silver, a method of spray pyrolysis of a liquid containing a silver salt or a method by vacuum sputtering may, for example, be mentioned.

Further, as the antibacterial substance-containing layer, a layer of a natural antibacterial agent represented by Japanese horseradish, a metal antibacterial agent represented by copper or zinc, an oxide antibacterial agent represented by titanium oxide, other than silver, may be formed by a known method.

The silver ion diffusion layer which is the antibacterial substance-containing layer of the glass substrate for a display cover glass of the present invention preferably has a silver amount of from 0.2 to 100 μg/cm$^2$ at a depth of 40 μm from the glass substrate surface. If the silver amount of the glass substrate is less than 0.2 μg/cm$^2$, no sufficient antibacterial effects will be obtained. Further, if it exceeds 100 μg/cm$^2$, the silver amount diffused in the silver ion diffusion layer tends to be too large, whereby glass may be colored due to silver colloid. The silver amount is preferably from 0.4 to 80 μg/cm$^2$, more preferably from 0.6 to 60 μg/cm$^2$, particularly preferably from 0.8 to 20 μm/cm$^2$, and most preferably from 1.0 to 15 μg/cm$^2$.

The present inventors have confirmed the relation between the silver amount of the glass substrate and the antibacterial effect by the following method. Further, plate-form borosilicate glass (PYREX (registered trademark)) was prepared, and antibacterial activity-imparted glass substrates having silver amounts of 0.2, 0.4 and 0.6 μg/cm$^2$, respectively, at a depth of 40 μm from the glass substrate surface, were prepared. With respect to these glass substrates, in accordance with JIS Z2801 (test for antibacterial activity), the number of bacteria (*Escherichia coli. Staphylococcus aureus*) in glass samples 24 hours later under the conditions specified, was confirmed. The sterilization ratio was calculated by comparison with a non-treated film treated under the same conditions. As a result, with respect to the glass substrate with a silver amount of 0.2 μg/cm$^2$, 90% or more bacteria were killed, and with respect to the glass substrates with silver amounts of 0.4 and 0.6 μg/cm$^2$, 99% or more bacteria were killed. Therefore, the present inventors have considered that when the silver amount is at least 0.2 μg/cm$^2$ at a depth of 40 μm from the glass substrate surface, the glass substrate has an antibacterial effect.

At a portion where two layers of the surface compressive stress layer and the antibacterial substance-containing layer are formed, regardless of the order of formation, the two layers are blended together in many cases at least on the outermost surface of the glass substrate, but they may be laminated in two layers in order of the formation.

Not only the glass substrate surface has both of the surface compressive stress layer and the antibacterial substance-containing layer, but also one part of the glass substrate surface comprises the surface compressive stress layer and the other part comprises the antibacterial substance-containing layer. Further, one part of the glass substrate surface comprises both of the surface compressive stress layer and the antibacterial substance-containing layer, and the other part comprises either one of the surface compressive stress layer and the antibacterial substance-containing layer. Further, on the glass substrate surface, there may be a portion where neither of the surface compressive stress layer nor the antibacterial substance-containing layer is formed.

The glass substrate for a display cover glass of the present invention has a ratio (transmittance ratio (T1/T2)) of the transmittance T1 at a wavelength of 428 nm to the transmittance T2 at a wavelength of 650 nm of the glass substrate of at least 0.95, and has a transmittance of at least 86% at wavelength of 428 nm when the thickness of the glass substrate is from 0.1 to 3.0 mm.

The reason why a wavelength of 428 nm is employed is that coloring of glass by silver colloid can directly be evaluated since the absorption wavelength when glass is colored by silver colloid reaches the local maximum in the vicinity of this wavelength. Further, the reason why a wavelength of 650 nm is employed is that if glass is colored by silver colloid, the transmittance is influenced not only in the waveband in the vicinity of 428 nm but also in a range of about 100 nm around this wavelength, and accordingly the wavelength of 650 nm is selected as it is the wavelength in the visible region which is not influenced by the above. Further, the ratio (T1/T2) of the transmittance T1 at a wavelength of 428 nm to the transmittance T2 at a wavelength of 650 nm of the glass substrate is at least 0.95, and the transmittance at a wavelength of 428 nm is at least 86% when the thickness of the glass substrate is from 0.1 to 3.0 mm, and by having such transmittance characteristics, a glass substrate free from coloring by silver colloid and having a high transparency and a high visible transmittance suitable as a glass substrate for a display cover glass can be obtained.

If the transmittance at a wavelength of 428 nm is less than 86% when the thickness of the glass substrate is from 0.1 to 3.0 mm, or if the ratio (T1/T2) of the transmittance T1 at a wavelength of 428 nm to the transmittance T1 at a wavelength of 650 nm of the glass substrate is less than 0.95, the transparency and the visible transmittance will be low to such an extent that coloring of glass due to silver colloid is visually recognized, and if such a glass substrate is used for display devices, the visibility of the display screen will be lowered, such being unfavorable.

The glass substrate for a display cover glass of the present invention can be obtained by subjecting a plate-formed glass substrate to the chemical tempering treatment and the antibacterial treatment.

As a method of plate-forming the glass substrate, a float process, a down draw process, a press method or the like may be employed, and particularly when a large quantity of glass is to be plate-formed at a low cost, the float process is preferably employed.

In a case where the glass-substrate plate-formed by the float process is used without polishing, it is preferred to provide the antibacterial substance-containing layer on the surface opposite to the surface (hereinafter referred to as the tin-side surface) which was in contact with molten tin in the float process. This is because as on the glass substrate surface on the side of the tin-side surface, a tin component is diffused in glass, and if the silver ion diffusion layer is formed on this surface, silver in the silver ion diffusion layer is reduced by the tin component and is formed into a colloid, thereby colors glass.

However, in a case where it is necessary to form an electrode on the glass substrate surface, if an electrode is formed on the tin-side surface, a problem may arise such that glass is colored by the reaction of electrode material components and the tin component in the glass substrate. Accordingly, the surface compressive stress layer and the antibacterial substance-containing layer are provided on the tin-side surface. On that occasion, in order to suppress formation of silver in the silver ion diffusion layer on the tin-side surface into a colloid, in the antibacterial treatment, it is preferred to carry out the heat treatment at a temperature of at most 425° C. Further, in a case of forming an electrode on the glass substrate surface using e.g. a silver paste containing silver particles and low melting point glass as the main components, a firing step at a temperature higher than 425° C. is necessary, and in such a case, formation of a silver colloid can be avoided by forming the antibacterial substance-containing layer after formation of the electrode.

Now, the composition of the glass substrate of the present invention will be described with reference to contents as represented by mol % unless otherwise specified.

$SiO_2$ is an essential component to constitute a glass matrix. If its content is less than 55%, stability of glass deteriorates, or weather resistance deteriorates. It is preferably at least 60%. Further, if it exceeds 80%, the viscosity of glass will increase, and a melting property will remarkably be lowered. It is preferably at most 75%, typically at most 73%.

$Al_2O_3$ is an essential component to improve a rate of ion exchange. If its content is less than 0.1%, the rate of ion exchange tends to be low. It is preferably at least 1%, typically at least 1.5%. If the $Al_2O_3$ content exceeds 15%, the viscosity of glass tends to be high, and it tends to be difficult to melt glass homogeneously. It is preferably at most 11%, more preferably at most 8%.

$B_2O_3$ may be contained up to 15% for example, to improve the melting property at high temperature or to improve the glass strength. If its content exceeds 15%, glass tends to be unstable. It is preferably at most 10%, more preferably at most 8%. Further, in order to increase the silver amount of the glass substrate surface by the antibacterial treatment, it is preferably at most 5%, and it is more preferred that no $B_2O_3$ is contained.

ZnO may be contained up to 10% for example, to improve the melting property of glass at high temperature. If its content exceeds 10%, glass tends to be unstable. It is preferably at most 8%, more preferably at most 6%. Further, in order to increase the silver amount of the glass substrate surface by the antibacterial treatment, it is preferably at most 3%, and it is more preferred that no ZnO is contained.

$Na_2O$ is an essential component to form the surface compressive stress layer by ion exchange and to improve the melting property of the glass. If its content is less than 0.1%, it tends to be difficult to form a desired surface compressive layer by ion exchange. It is preferably at least 3%, typically at least 6%. If the $Na_2O$ content exceeds 15%, Tg i.e. the strain point tends to be low, or the weather resistance tends to be low. If Tg is low, the stress tends to be relaxed at the time of the chemical tempering, whereby it tends to be difficult to obtain desired chemical tempering properties. The content is preferably at most 14%, typically at most 13%.

$K_2O$ is a component to improve the melting property and to increase the rate of ion exchange by the chemical tempering thereby to obtain desired surface compressive stress and surface compressive stress layer, and is preferably contained in an amount of at most 10%. Its content is preferably at least 0.1%, more preferably at least 2%, typically at least 3%. If the $K_2O$ content exceeds 10%, the weather resistance tends to be low. It is preferably at most 8%, typically at most 6%.

The alkaline earth metal oxide is a component to improve the melting property and is a component effective to control Tg i.e. the strain point as well.

Each of MgO and CaO has a relatively small effect to lower the rate of ion exchange, and they may be contained in a content of MgO+CaO of at most 16%. If the content of MgO+CaO exceeds 16%, the rate of ion exchange tends to be low, glass tends to be devitrified, or the strain point tends to be too low. It is preferably at most 15%, more preferably at most 13%.

The glass substrate of the present invention typically has a glass composition comprising, as represented by mol % as calculated as oxides, from 55 to 80% of $SiO_2$, from 0.1 to 15% of $Al_2O_3$, from 0 to 15% of $B_2O_3$, from 0 to 10% of ZnO, from 0.1 to 15% of $Na_2O$, from 0 to 10% of $K_2O$ and from 0 to 16% of MgO+CaO.

The glass substrate of the present invention essentially comprises the above components but may contain other components within a range not to impair the object of the present invention. When such components are contained, the total content of these components is preferably at most 10%, typically at most 5%. Such other components will be described below.

BaO and SrO have the highest effect to lower the rate of ion exchange among alkaline earth metal oxides, and accordingly when they are contained, their content is preferably less than 1%.

$ZrO_2$ is not essential but may be contained up to 5% so as to increase the rate of ion exchange. If its content exceeds 5%, the effect of increasing the rate of ion exchange will no longer increase, and the melting property tends to be deteriorated, whereby stones may remain in glass in some cases. When $ZrO_2$ is contained, its content is preferably at least 0.5%, typically at least 1%.

As a refining agent at the time of melting glass, $SO_3$, chlorides, fluorides, $Sb_2O_3$, $As_2O_3$ and the like may appropriately be contained.

Further, it is preferred to reduce contamination of impurities in materials, such as $Fe_2O_3$, NiO and $Cr_2O_3$ having absorption in the visible region, as far as possible, and each content is preferably at most 0.15%, more preferably at most 0.05% as represented by mass %.

The glass substrate for a display cover glass of the present invention is suitably used as a display front glass of display devices having input functions such as touch panel displays. The glass substrate for a cover glass of touch panel displays is required to have high visibility as a display device, a high strength capable of enduring the load when operated by touching, and antibacterial properties to maintain hygiene even though the general public use, and the glass substrate for a display cover glass of the present invention sufficiently has these properties.

Further, by using the glass substrate for a display cover glass as the front glass of displays, a display device having a high visibility as a display device, a high strength capable of enduring the load when operated or carried, and antibacterial properties to maintain hygiene, can be obtained.

Now, the process for producing the glass substrate for a display cover glass of the present invention will be described.

The process for producing a glass substrate for a display cover glass of the present invention comprises a step of chemically tempering a glass substrate in a molten salt containing at least $KNO_3$, a step of cleaning the chemically tempered glass substrate, a step of forming a silver film on the surface of the cleaned glass substrate, a step of subjecting the glass substrate having the silver film formed thereon to heat treatment to diffuse silver ions from the glass substrate surface to the inside, and a step of washing and removing silver remaining on the surface, not diffused in the inside of the glass substrate in the above step of diffusing silver ions.

Further, the process for producing a glass substrate for a display cover glass of the present invention comprises a step of plate-forming a glass substrate, a step of chemically tempering the plate-formed glass substrate in a molten salt containing at least $KNO_3$, a step of cleaning the chemically tempered glass substrate, a step of forming a silver film on the surface of the cleaned glass substrate, a step of subjecting the glass substrate having the silver film formed thereon to heat treatment to diffuse silver ions from the glass substrate surface to the inside, and a step of washing and removing silver remaining on the surface, not diffused into the inside of the glass substrate in the above step of diffusing silver ions.

The step of plate-forming a glass substrate is not particularly limited in detail, however, for example, the plate-formed glass substrate is produced in such a manner that various materials are properly blended, heated at about 1,400 to 1,600° C. and melted, homogenized by deforming, stirring or the like, and formed into a plate by a known float process, down draw process or press method, annealed and then cut into a desired size, followed by polishing.

The chemical tempering step is not particularly limited so long as $Na_2O$ on the glass substrate surface can be ion-exchanged with $K_2O$ in the molten salt, and for example, a method of dipping the glass substrate in a heated molten salt containing potassium nitrate ($KNO_3$) may be mentioned.

The conditions to form the chemically tempered layer (surface compressive stress layer) having a desired surface compressive stress on the glass substrate vary depending upon the thickness of the glass substrate, however, it is typical that the glass substrate is dipped in a molten salt containing $KNO_3$ at from 400 to 550° C. for from 2 to 20 hours. From the economical viewpoint, it is preferred to dip the glass substrate in the molten salt at from 400 to 500° C. for from 2 to 16 hours, more preferably at 400 to 500° C. for from 2 to 10 hours.

In the cleaning step, the molten salt containing potassium nitrate ($KNO_3$) used in the chemical tempering step and stains are removed from the glass substrate surface. This is because if the glass substrate surface is stained, in the step of forming a silver film as the following step, unevenness or missing may occur on the silver film. The cleaning method is not particularly limited and may, for example, be a method of spraying the glass substrate with distilled water or the like, a method of dipping the glass substrate in a water bath and applying ultrasonic vibration, or a method of scrubbing the glass substrate with a polishing agent.

The step of forming a silver film on the surface of the glass substrate and the step of diffusing silver ions are steps to form the antibacterial substance-containing layer on the glass substrate surface.

The step of forming a silver film may be a method of mixing silver with glass materials, followed by melt forming, a method of forming a coating layer containing silver on the glass substrate surface, or a method of coating the glass substrate surface with a liquid containing silver, followed by heat treatment to form a silver ion diffusion layer over from the glass substrate surface to the inside of the substrate, and in view of the productivity and the equipment cost, it is preferred to employ the method of forming a silver ion diffusion layer.

The heat temperature conditions in the step of diffusing silver ions vary depending on the composition of the glass substrate, the silver amount applied, and heating conditions for heat diffusion, and preferred is treatment at from 250 to 500° C. If the heating temperature is less than 250° C., the diffusion rate tends to be low, and it will take long to diffuse silver to develop the antibacterial effect, such being uneconomical. If it exceeds 500° C., a large amount of silver will be diffused even in short time and is formed into silver colloid, whereby glass is colored and absorbs the wavelength in the vicinity of 428 nm, such being unfavorable. The more preferred heating temperature is from 300 to 475° C. If it is at least 300° C., silver to develop the antibacterial effect can be diffused in a short time, and if it is at most 475° C., a larger amount of silver can be diffused without coloring.

The step of washing and removing silver remaining on the surface is carried out to remove the silver residue not diffused in the glass inside, formed after heat diffusion of silver. The washing method is not particularly limited, and for example, it is preferred to wash the glass substrate with a solution containing any of $HNO_3$, $FeCl_3$, $Fe(NO_3)_3$, $HCl$, $H_2SO_4$ and $H_2O_2$.

To obtain a glass substrate for a display cover glass of the present invention, which comprises a surface compressive stress layer and an antibacterial substance-containing layer on the glass substrate surface, and which has predetermined transmittance characteristics, the production process is not limited to the above-described production process, and it is also possible to conduct chemical tempering treatment after the glass substrate is subjected to the antibacterial treatment.

However, it is not preferred to conduct the chemical tempering treatment and the antibacterial treatment simultaneously on the glass substrate. If these treatments are conducted simultaneously, the treatment step and the cleaning step can be reduced, such being advantageous in that the glass substrate can be produced at a low cost. However, when the diffusion rates of silver ions and potassium ions into the glass substrate surface are compared, the diffusion rate of silver ions is higher than that of potassium ions. Accordingly, if the chemical tempering treatment is conducted for a time required to form the surface compressive stress layer to obtain the desired strength, silver ions will excessively be diffused in the glass substrate surface, whereby coloring due to silver colloid will occur, and optical properties required for a glass substrate for a display cover glass, that is, the above-described transmittance characteristics will not be obtained.

From the above reason, to obtain the glass substrate for a display cover glass of the present invention, the chemical tempering treatment and the antibacterial treatment should be conducted separately.

EXAMPLES

Now, the present invention will be described in further detail with reference to Examples of the present invention and Comparative Examples. However, it should be understood that the present invention is by no means restricted to the following Examples.

In the following Examples and Comparative Examples, glasses A, B, C and D having the glass compositions as identified in Table 1 were used. In Table 1, the blanks in the respective components mean a content of 0 mol %.

With respect to each glass, usually used glass materials such as oxides, hydroxides, carbonates and nitrates were appropriately selected so as to be compositions as represented by mol % shown in columns of the respective components in Table 1, such materials were weighed so as to be 800 g of glass and mixed. Then, the mixture was put in a platinum crucible, the platinum crucible was put in a resistant heat type electric furnace at 1,600° C., and the mixture was melted for three hours, refined and homogenized, and cast in a mold and annealed at a predetermined temperature to obtain a glass block. The glass block was cut into a size of 40 mm×40 mm×about 0.3 to 1.0 mm in thickness and polished, and finally both surfaces were mirror polished to obtain a plate-form glass. With respect to glass A, the plate forming was conducted by the float process, and the plate was cut into a size of 40 mm×40 mm and polished, and finally both surfaces were mirror polished to obtain a plate-form glass substrate.

TABLE 1

| Mol % | Glass A | Glass B | Glass C | Glass D |
|---|---|---|---|---|
| $SiO_2$ | 72 | 64.5 | 71.3 | 70.6 |
| $Al_2O_3$ | 1.1 | 6 | 2 | 2.6 |
| $B_2O_3$ | | | | 7.7 |
| ZnO | | | | 4.4 |
| $Na_2O$ | 12.6 | 12 | 10.8 | 6.7 |
| $K_2O$ | 0.2 | 4 | 4.6 | 4.7 |
| MgO | 5.5 | 11 | 10.4 | |
| CaO | 8.6 | 0.11 | 0.3 | |
| SrO | | 0.06 | 0.03 | |
| BaO | | 0.04 | 0.02 | |
| $TiO_2$ | | | | 3.2 |
| $ZrO_2$ | | 2.5 | 0.5 | |
| $Sb_2O_3$ | | | | 0.1 |
| $Fe_2O_3$ | | 0.005 | | |
| $Na_2SO_4$ | | 0.09 | | |

Then, each of the obtained glass substrates was dipped in a molten salt containing $KNO_3$ for a predetermined time to obtain a glass substrate having a surface compressive stress layer on its surface. Various conditions (molten salt concentration, time and temperature) for the chemical tempering treatment in Examples and Comparative Examples are as shown in Tables 2 to 5. The surface compressive stress of the glass substrate and the depth of the surface compressive stress layer were measured by a surface stress meter (manufactured by Orihara Seisakusho Corporation, FSM-6000). Further, the transmittance and the transmittance ratio (T1/T2) were calculated from the spectral transmittance obtained by using an ultraviolet near-infrared spectrophotometer (manufactured by JASCO Corporation, V570).

Then, antibacterial treatment was conducted on each glass substrate subjected to the chemical tempering treatment. The specific treatment method is as follows. On the chemically tempered surface of the glass substrate, a sponge was impregnated with a solution (cerium oxide concentration: 1 mass %) having cerium oxide (grain size #5000 by JIS R6001) dispersed in pure water, and the silver film-formed surface was evenly rubbed and cleaned using the sponge (from about 10 to about 30 seconds to the substrate of 40 mm×40 mm). On that occasion, it was not necessary to apply a strong force, and the glass surface could be made to be a clean surface without stains by a force at the same level as usual cleaning or lighter. After cleaning, the glass substrate was rinsed with water so that the polishing agent would not remain. Then, a stannous chloride aqueous solution (one having 1 g of stannous chloride put and dissolved in 1,000 ml of distilled water) as an activating agent was sprayed or run on and was brought into contact with the glass substrate, and then immediately discharged, and the glass substrate was cleaned with pure water.

Then, an aqueous ammonia solution and potassium hydroxide were added to a solution having silver nitrate dissolved in pure water to prepare a silver preparation. The silver concentration in the silver preparation was 0.67 g as calculated as the mass of $AgNO_3$ contained in 100 ml of the silver preparation. Glucose as a reducing agent was added to the silver preparation to prepare a solution, which was poured into a pallet in which the glass substrate was placed, and the glass substrate was left to stand for from 30 seconds to 120 seconds in a state where it was immersed in the solution, whereby a silver mirror surface was formed on the glass substrate. Here, the reason why potassium hydroxide was added is to adjust the acidic silver nitrate solution to be alkaline thereby to accelerate oxidation of the reducing liquid. The alkaline solution is not limited to potassium hydroxide so long as it can adjust the silver nitrate solution to be alkaline. Although addition of the aqueous ammonia solution alone has the same effect, potassium hydroxide was used in combination to reduce the ammonia odor in the process.

Then, the silver mirror surface was rinsed with pure water and dried, and then the glass substrate was heated from room temperature to the predetermined firing temperature (250 to 500° C.) in an electric furnace at a rate of 200° C./h to carry out heat treatment for a predetermined time. After the heat treatment, the silver residue attached to glass was completely removed by using a small amount of nitric acid (for example, 2 mol/L), and then the glass substrate was washed with pure water and dried to obtain a glass substrate subjected to chemical tempering treatment and antibacterial treatment. Of the obtained glass substrate subjected to chemical tempering treatment and antibacterial treatment, chemical tempering properties (the depth of the surface compressive stress layer and the surface compressive stress), the transmittance at a wavelength of 428 nm, the transmittance ratio (T1/T2) and the silver amount (fluorescent X-ray Ag intensity) diffused in the glass substrate surface were measured.

The silver amount diffused in the glass substrate surface was measured by a fluorescent X-ray measuring apparatus (manufactured by Rigaku Corporation, ZSX Primus 2). First, the Ag-Lα intensity of a silver-plated mirror with a known silver amount was measured by using the fluorescent X-ray measuring apparatus to prepare a calibration curve of the silver amount and the Ag-Lα intensity. Further, the Ag-Lα intensity of each of the glass substrates in Examples and Comparative Examples was measured, and the silver amount was determined by calculation from the measured relative intensity. With respect to the Ag-Lα intensity, analysis at a depth of about 40 μm in glass is possible, and this measured relative value was regarded as the measured value of the silver amount diffused from the glass substrate surface to the depth of 40 μm.

The above obtained chemical tempering conditions, antibacterial treatment conditions and glass substrate properties in Examples and Comparative Examples are shown in Tables 2 to 5. In Tables, Examples 1 to 5 and 8 to 18 are Examples of the present invention, and Examples 6, 7 and 19 to 21 are Comparative Examples. Further, in Examples 19 to 21 which are Comparative Examples, the chemical tempering treatment and the antibacterial treatment were conducted simultaneously under the treatment conditions as described in Examples 4, 5 and 7 in JP-A-11-228186, respectively. That is, as the method of the chemical tempering treatment and the antibacterial treatment, the glass substrate was dipped in a molten salt containing $KNO_3$ and $AgNO_3$ for a predetermined time, washed with pure water and then dried to obtain a glass substrate comprising a surface compressive stress layer and an antibacterial substance-containing layer on its surface.

TABLE 2

| | | Ex. 1 | Ex. 2 | Ex. 3 | Ex. 4 | Ex. 5 | Ex. 6 | Ex. 7 |
|---|---|---|---|---|---|---|---|---|
| Glass substrate | Type of glass | Glass A | Glass A | Glass A | Glass A | Glass A | Glass A | Glass A |
| | Thickness (mm) | 0.32 | 0.32 | 0.32 | 0.32 | 0.32 | 0.32 | 0.32 |
| Chemical tempering conditions | $KNO_3$ (mass %) | 85 | 90 | 94 | 99 | 96 | — | 70 |
| | $NaNO_3$ (mass %) | 15 | 10 | 6 | 1 | 4 | — | 30 |
| | Temperature (° C.) | 420 | 420 | 420 | 420 | 420 | — | 420 |
| | Time (h) | 5.8 | 23.1 | 5.8 | 19 | 4.7 | — | 27.2 |
| Substrate properties after chemical tempering | Surface compressive stress (MPa) | 325 | 403 | 457 | 601 | 559 | 0 | 241 |
| | Depth of surface compressive stress layer (μm) | 9 | 16 | 9 | 17 | 8 | 0 | 15 |
| | Transmittance: 428 nm (%) | 91 | 91 | 91 | 91 | 91 | 91 | 91 |
| | Transmittance ratio: 428 nm/650 nm | 0.996 | 0.996 | 0.996 | 0.996 | 0.996 | 0.996 | 0.996 |
| | Fluorescent X-ray Ag intensity (μm/cm$^2$) | 0 | 0 | 0 | 0 | 0 | 0 | 0 |
| Antibacterial treatment conditions | Antibacterial surface | Polished surface | Polished surface | Polished surface | Polished surface | Polished surface | Polished surface | Polished surface |
| | Firing temperature (° C.) | 350 | 350 | 350 | 350 | 350 | 350 | 350 |
| | Firing time (h) | 15 | 15 | 15 | 15 | 15 | 15 | 15 |
| Glass substrate properties (after chemical tempering and antibacterial treatment) | Surface compressive stress (MPa) | 326 | 360 | 433 | 512 | 515 | 0 | 220 |
| | Depth of surface compressive stress layer (μm) | 8 | 17 | 8 | 17 | 8 | 0 | 17 |
| | Transmittance: 428 nm (%) | 89.0 | 88.7 | 90.6 | 90.1 | 90.2 | 90.7 | 84.3 |
| | Transmittance ratio: 428 nm/650 nm | 0.983 | 0.980 | 0.998 | 0.995 | 0.996 | 0.994 | 0.933 |
| | Fluorescent X-ray Ag intensity (μg/cm$^2$) | 4.2 | 5.5 | 4.2 | 2.4 | 1.9 | 4.3 | 8.2 |

TABLE 3

| | | Ex. 8 | Ex. 9 | Ex. 10 | Ex. 11 | Ex. 12 |
|---|---|---|---|---|---|---|
| Glass substrate | Type of glass | Glass B | Glass B | Glass B | Glass B | Glass B |
| | Thickness (mm) | 0.97 | 0.97 | 0.97 | 0.97 | 0.97 |
| Chemical tempering conditions | $KNO_3$ (mass %) | 95 | 95 | 98 | 100 | 100 |
| | $NaNO_3$ (mass %) | 5 | 5 | 2 | 0 | 0 |
| | Temperature (° C.) | 400 | 450 | 425 | 400 | 450 |
| | Time (h) | 6 | 10 | 6 | 6 | 6 |
| Substrate properties after chemical tempering | Surface compressive stress (MPa) | 544 | 513 | 673 | 906 | 808 |
| | Depth of surface compressive stress layer (μm) | 31 | 69 | 42 | 31 | 54 |
| | Transmittance: 428 nm (%) | 90.6 | 90.6 | 90.6 | 90.6 | 90.6 |
| | Transmittance ratio: 428 nm/650 nm | 0.993 | 0.993 | 0.993 | 0.993 | 0.993 |
| | Fluorescent X-ray Ag intensity (μm/cm$^2$) | 0 | 0 | 0 | 0 | 0 |
| Antibacterial treatment conditions | Antibacterial surface | Polished surface | Polished surface | Polished surface | Polished surface | Polished surface |
| | Firing temperature (° C.) | 350 | 350 | 350 | 350 | 350 |
| | Firing time (h) | 15 | 15 | 15 | 15 | 15 |
| Glass substrate properties (after chemical tempering and antibacterial treatment) | Surface compressive stress (MPa) | 508 | 508 | 655 | 857 | 790 |
| | Depth of surface compressive stress layer (μm) | 31 | 68 | 42 | 30 | 54 |
| | Transmittance: 428 nm (%) | 91.1 | 91.0 | 91.1 | 91.3 | 88.4 |
| | Transmittance ratio: 428 nm/650 nm | 0.993 | 0.994 | 0.993 | 0.991 | 0.987 |
| | Fluorescent X-ray Ag intensity (μg/cm$^2$) | 1.1 | 1.1 | 1.0 | 1.1 | 1.3 |

TABLE 4

|  |  | Ex. 13 | Ex. 14 | Ex. 15 | Ex. 16 | Ex. 17 | Ex. 18 |
|---|---|---|---|---|---|---|---|
| Glass substrate | Type of glass | Glass C | Glass C | Glass C | Glass D | Glass D | Glass D |
|  | Thickness (mm) | 0.98 | 0.98 | 0.98 | 0.89 | 0.89 | 0.89 |
| Chemical tempering conditions | $KNO_3$ (mass %) | 100 | 98 | 100 | 100 | 98 | 100 |
|  | $NaNO_3$ (mass %) | 0 | 2 | 0 | 0 | 2 | 0 |
|  | Temperature (° C.) | 450 | 400 | 375 | 450 | 400 | 375 |
|  | Time (h) | 10 | 10 | 10 | 10 | 10 | 10 |
| Substrate properties after chemical tempering | Surface compressive stress (MPa) | 465 | 488 | 622 | 394 | 394 | 486 |
|  | Depth of surface compressive stress layer (μm) | 83 | 42 | 30 | 37 | 22 | 15 |
|  | Transmittance: 428 nm (%) | 91 | 91 | 91 | 90.8 | 90.8 | 90.8 |
|  | Transmittance ratio: 428 nm/650 nm | 0.998 | 0.998 | 0.998 | 0.993 | 0.993 | 0.993 |
|  | Fluorescent X-ray Ag intensity (μm/cm$^2$) | 0 | 0 | 0 | 0 | 0 | 0 |
| Antibacterial treatment conditions | Antibacterial surface | Polished surface | Polished surface | Polished surface | Polished surface | Polished surface | Polished surface |
|  | Firing temperature (° C.) | 350 | 350 | 350 | 350 | 350 | 350 |
|  | Firing time (h) | 15 | 15 | 15 | 15 | 15 | 15 |
| Glass substrate properties (after chemical tempering and antibacterial treatment) | Surface compressive stress (MPa) | 455 | 462 | 570 | 404 | 424 | 489 |
|  | Depth of surface compressive stress layer (μm) | 84 | 44 | 31 | 36 | 23 | 14 |
|  | Transmittance: 428 nm (%) | 88.4 | 90.7 | 90.8 | 90.3 | 90.3 | 90.9 |
|  | Transmittance ratio: 428 nm/650 nm | 0.993 | 1.00 | 1.00 | 0.992 | 0.993 | 0.994 |
|  | Fluorescent X-ray Ag intensity (μg/cm$^2$) | 2.2 | 1.7 | 2.7 | 0.45 | 0.40 | 0.45 |

TABLE 5

|  |  | Ex. 19 | Ex. 20 | Ex. 21 |
|---|---|---|---|---|
| Glass substrate | Type of glass | Glass A | Glass A | Glass A |
|  | Thickness (mm) | 0.32 | 0.32 | 0.32 |
| Substrate properties before chemical tempering | Surface compressive stress (MPa) | 0 | 0 | 0 |
|  | Depth of surface compressive stress layer (μm) | 0 | 0 | 0 |
|  | Transmittance: 428 nm (%) | 91 | 91 | 91 |
|  | Transmittance ratio: 428 nm/650 nm | 0.996 | 0.996 | 0.996 |
|  | Fluorescent X-ray Ag intensity (μm/cm$^2$) | 0 | 0 | 0 |
| Chemical tempering treatment and antibacterial treatment conditions | $KNO_3$ (mass %) | 99.9 | 99.9 | 99.9 |
|  | $NaNO_3$ (mass %) | 0 | 0 | 0 |
|  | $AgNO_3$ (mass %) | 0.1 | 0.1 | 0.1 |
|  | Treatment temperature (° C.) | 460 | 460 | 460 |
|  | Treatment time (h) | 1 | 16 | 24 |
| Glass substrate properties (after chemical tempering and antibacterial treatment) | Surface compressive stress (MPa) | 323 | 221 | 211 |
|  | Depth of surface compressive stress layer (μm) | 33 | — | — |
|  | Transmittance: 428 nm (%) | 85.2 | 66.2 | 59.2 |
|  | Transmittance ratio: 428 nm/650 nm | 0.941 | 0.747 | 0.677 |
|  | Fluorescent X-ray Ag intensity (μg/cm$^2$) | 147.7 | 185.3 | 185.9 |

Each of the glass substrates (Examples of the present invention) of the present invention obtained had a ratio (T1/T2) of the transmittance T1 at a wavelength of 428 nm to the transmittance T2 at a wavelength of 650 nm of the glass substrate of at least 0.95, and a transmittance at a wavelength of 428 nm of at least 86%, and had a high transparency and a high visible transmittance suitable as a glass substrate for a display cover glass. Further, it had a depth of the surface compressive stress layer of at least 3 μm, a surface compressive stress of at least 250 MPa and a silver amount at a depth of 40 μm from the glass substrate surface of from 0.2 to 100 μg/cm$^2$, and is considered to have a high strength and antibacterial properties. Whereas the glass substrate in Example 6 (Comparative Example) had no surface compressive stress layer on the glass substrate surface and had insufficient strength, since chemical tempering treatment was not conducted. The glass substrate in Example 7 (Comparative Example) had a low surface compressive stress and insufficient strength, and had a low transmittance at a wavelength of 428 nm and a low transmittance ratio (T1/T2), and was insufficient as a glass substrate for a display cover glass in view of the transparency and the visible transmittance. It is considered to be because in the glass substrate in which no sufficient surface compressive stress is formed by the chemical tempering treatment, diffusion of silver ions is accelerated by the antibacterial treatment as potassium ions have a larger ionic radius than silver ions, and coloring of the glass substrate occurred by silver colloid resultingly.

Further, each of the glass substrates in Examples 19 to 21 (Comparative Examples) had a low transmittance at a wavelength of 428 nm and a low transmittance ratio (T1/T2), and was insufficient as a glass substrate for a display cover glass in view of the transparency and the visible transmittance. This is considered to be because silver ions were excessively diffused in the glass substrate surface by conducting the chemical tempering treatment and the antibacterial treatment simultaneously, whereby coloring of glass by occurrence of silver colloid was remarkable, and optical properties of glass were deteriorated.

Then, with respect to the non-polished glass A plate-formed by the float process, the difference in the glass substrate properties between cases where an antibacterial substance-containing layer was provided on the tin-side surface and on the opposite side to the tin-side surface, was confirmed.

First, chemical tempering treatment was applied to glass A having a thickness of 0.55 mm to prepare a glass substrate having a surface compressive stress of 441 MPa, a thickness of the surface compressive stress layer of 7 μm, a transmittance (wavelength: 428 nm) of 91%, a transmittance ratio (T1/T2) of 0.996 and a fluorescent X-ray Ag intensity of 0 μg/cm$^2$. With respect to such a glass substrate, antibacterial treatment was conducted on the tin-side surface and on the opposite side to the tin-side surface under the respective conditions, and the properties of the obtained glass substrate was examined. The antibacterial treatment conditions and the glass substrate properties in Examples and Comparative Examples thus obtained are shown in Tables 6 and 7. In Tables, Examples 22 to 29 and 30 to 35 are Examples of the present invention, and Examples 36 and 37 are Comparative Examples.

From the obtained results, in a case where the antibacterial treatment was conducted on the tin-side surface, in Examples 36 and 37 (both Comparative Examples) in which the firing temperature was high (at least 450° C.), glass was colored and the transmittance at a wavelength of 428 nm and the transmittance ratio (T1/T2) were very low. This is considered to be because the tin component diffused in the glass substrate surface on the tin-side surface reduced silver in the silver ion diffusion layer which was the antibacterial substance-containing layer to form silver colloid, which colored glass. Whereas in Examples 31 to 35 (Examples of the present invention) in which the antibacterial treatment was conducted on the tin-side surface, it is considered that the transmittance was not low as the firing temperature was low and the occurrence of silver colloid was thereby suppressed.

Further, in Examples 30 and 37 in which the firing temperature in the antibacterial treatment was high, the surface compressive stress was very low. This is considered to be because the surface compressive stress generated in the chemical tempering treatment was relaxed by firing. Whereas in Examples of the present invention (Examples 22 to 29 and 31 to 35) in which the antibacterial treatment was conducted at a firing temperature of at most 475° C., no

TABLE 6

| | | Ex. 22 | Ex. 23 | Ex. 24 | Ex. 25 | Ex. 26 | Ex. 27 | Ex. 28 | Ex. 29 | Ex. 30 |
|---|---|---|---|---|---|---|---|---|---|---|
| Glass substrate | Type of glass | Glass A | Glass A | Glass A | Glass A | Glass A | Glass A | Glass A | Glass A | Glass A |
| | Thickness (mm) | 0.55 | 0.55 | 0.55 | 0.55 | 0.55 | 0.55 | 0.55 | 0.55 | 0.55 |
| Antibacterial treatment conditions | Antibacterial-treated surface | Opposite side to tin-side surface | | | | | | | | |
| | Firing temperature (° C.) | 250 | 300 | 350 | 350 | 350 | 350 | 400 | 450 | 500 |
| | Firing time (h) | 15 | 15 | 5 | 15 | 30 | 60 | 15 | 15 | 15 |
| Glass substrate properties (after chemical tempering and antibacterial treatment) | Surface compressive stress (MPa) | 433 | 409 | 441 | 429 | 438 | 441 | 401 | 295 | 67 |
| | Depth of surface compressive stress layer (μm) | 8 | 8 | 9.3 | 9.3 | 7.5 | 7.5 | 9.4 | 9.8 | 19.6 |
| | Transmittance: 428 nm (%) | 90.2 | 90.0 | 89.9 | 89.7 | 90.1 | 90.1 | 89.7 | 90.2 | 87.6 |
| | Transmittance ratio: 428 nm/650 nm | 0.997 | 0.996 | 0.996 | 0.995 | 0.998 | 0.998 | 0.998 | 0.996 | 0.968 |
| | Fluorescent X-ray Ag intensity (μg/cm$^2$) | 0.5 | 1.2 | 1.8 | 1.8 | 2.0 | 2.4 | 3.7 | 10.8 | 20.3 |

TABLE 7

| | | Ex. 31 | Ex. 32 | Ex. 33 | Ex. 34 | Ex. 35 | Ex. 36 | Ex. 37 |
|---|---|---|---|---|---|---|---|---|
| Glass substrate | Type of glass | Glass A | Glass A | Glass A | Glass A | Glass A | Glass A | Glass A |
| | Thickness (mm) | 0.55 | 0.55 | 0.55 | 0.55 | 0.55 | 0.55 | 0.55 |
| Antibacterial treatment conditions | Antibacterial-treated surface | Tin-side surface | | | | | | |
| | Firing temperature (° C.) | 350 | 350 | 350 | 350 | 400 | 450 | 500 |
| | Firing time (h) | 5 | 15 | 30 | 60 | 15 | 15 | 15 |
| Glass substrate properties (after chemical tempering and antibacterial treatment) | Surface compressive stress (MPa) | 438 | 435 | 446 | 427 | 407 | 296 | 32 |
| | Depth of surface compressive stress layer (μm) | 5.9 | 7.6 | 5.8 | 6 | 5.9 | 8.9 | 9.7 |
| | Transmittance: 428 nm (%) | 89.5 | 89.8 | 89.3 | 88.8 | 86.0 | 70.8 | 52.0 |
| | Transmittance ratio: 428 nm/650 nm | 0.992 | 0.994 | 0.993 | 0.985 | 0.956 | 0.802 | 0.604 |
| | Fluorescent X-ray Ag intensity (μg/cm$^2$) | 2.0 | 1.9 | 2.1 | 2.7 | 4.4 | 12.9 | 23.6 | remarkable decrease of the surface compressive stress was observed, and the obtained glass substrate had a high strength.

INDUSTRIAL APPLICABILITY

According to the present invention, it is possible to provide a glass substrate for a display cover glass not only having excellent strength and antibacterial properties but also having a high transparency and a high visible transmittance by suppressing coloring of glass due to silver colloid.

This application is a continuation of PCT Application No. PCT/JP2010/070621, filed on Nov. 18, 2010, which is based upon and claims the benefit of priority from Japanese Patent Application No. 2009-267869 filed on Nov. 25, 2009. The contents of those applications are incorporated herein by reference in its entirety.

What is claimed is:

1. A glass substrate for a display cover glass, which comprises a surface compressive stress layer and an antibacterial substance-containing layer on the glass substrate surface, wherein the glass substrate has a ratio (T1/T2) of the transmittance T1 at a wavelength of 428 nm to the transmittance T2 at a wavelength of 650 nm of the glass substrate of at least 0.95, and a transmittance at a wavelength of 428 nm of at least 86% when the thickness of the glass substrate is from 0.1 to 3.0 mm, and
wherein the antibacterial substance-containing layer is a silver ion diffusion layer having silver ions diffused in the glass substrate surface and the silver is present in an amount of from 0.2 to 100 µg/cm$^2$ at a depth of 40 µm from the glass substrate surface.

2. The glass substrate for a display cover glass according to claim 1, wherein the glass substrate has a glass composition comprising, as represented by mol % as calculated as oxides, from 55 to 80% of $SiO_2$, from 0.1 to 15% of $Al_2O_3$, from 0 to 15% of $B_2O_3$, from 0 to 10% of ZnO, from 0.1 to 15% of $Na_2O$, from 0 to 10% of $K_2O$, and from 0 to 16% of MgO+CaO.

3. The glass substrate for a display cover glass according to claim 1, wherein the surface compressive stress layer on the glass substrate surface is formed by chemical tempering, and the surface compressive stress layer has a depth of at least 3 µm and a surface compressive stress of a least 250 MPa.

4. The glass substrate for a display cover glass according to claim 1, wherein the silver ion diffusion layer has a silver amount of from 0.4 to 80 µg/cm$^2$ at a depth of 40 µm from the glass substrate surface.

5. The glass substrate for a display cover glass according to claim 1, wherein the glass substrate is plate-formed by a float process.

6. The glass substrate for a display cover glass according to claim 1, wherein the silver ion diffusion layer has a silver amount of from 0.6 to 60 µg/cm$^2$ at a depth of 40 µm from the glass substrate surface.

7. The glass substrate for a display cover glass according to claim 1, wherein the silver ion diffusion layer has a silver amount of from 0.8 to 20 µg/cm$^2$ at a depth of 40 µm from the glass substrate surface.

8. The glass substrate for a display cover glass according to claim 1, wherein the silver ion diffusion layer has a silver amount of from 1 to 15 µg/cm$^2$ at a depth of 40 µm from the glass substrate surface.

9. The glass substrate for a display cover glass according to claim 2, wherein the amount of $SiO_2$ in said glass substrate, as represented by mol % as calculated as oxides, is from 60 to 75%.

10. The glass substrate for a display cover glass according to claim 2, wherein the amount of $Al_2O_3$ in said glass substrate, as represented by mol % as calculated as oxides, is from 1 to 11%.

11. The glass substrate for a display cover glass according to claim 2, wherein the amount of $B_2O_3$ in said glass substrate, as represented by mol % as calculated as oxides, is from 0 to 10%.

12. The glass substrate for a display cover glass according to claim 2, wherein the amount of ZnO in said glass substrate, as represented by mol % as calculated as oxides, is from 0 to 8%.

13. The glass substrate for a display cover glass according to claim 2, wherein the amount of $Na_2O$ in said glass substrate, as represented by mol % as calculated as oxides, is from 3 to 14%.

14. The glass substrate for a display cover glass according to claim 2, wherein the amount of $K_2O$ in said glass substrate, as represented by mol % as calculated as oxides, is from 0.1 to 8%.

15. The glass substrate for a display cover glass according to claim 2, wherein the amount of MgO+CaO in said glass substrate, as represented by mol % as calculated as oxides, is from 0 to 15%.

16. A display device having a glass substrate for a display cover glass as a front glass of a display, which comprises a surface compressive stress layer and an antibacterial layer on the glass substrate surface, wherein the glass substrate has a ratio (T1/T2) of the transmittance T1 at a wavelength of 428 nm to the transmittance T2 at a wavelength of 650 nm of the glass substrate of at least 0.95, and a transmittance at a wavelength of 428 nm of at least 86% when the thickness of the glass substrate is from 0.1 to 3.0 mm, and wherein the antibacterial substance-containing layer is a silver ion diffusion layer having silver ions diffused in the glass substrate surface and the silver ions present in an amount of from 0.2 to 100 µg/cm$^2$ at a depth of 40 µm from the glass substrate surface.

* * * * *